United States Patent
Johnson

(10) Patent No.: US 9,772,423 B2
(45) Date of Patent: Sep. 26, 2017

(54) METHOD OF IMAGING THE ELECTRICAL CONDUCTIVITY DISTRIBUTION OF A SUBSURFACE

(71) Applicant: Timothy C. Johnson, Richland, WA (US)

(72) Inventor: Timothy C. Johnson, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 637 days.

(21) Appl. No.: 14/447,443

(22) Filed: Jul. 30, 2014

(65) Prior Publication Data

US 2016/0033668 A1 Feb. 4, 2016

(51) Int. Cl.
| | |
|---|---|
| G06F 19/00 | (2011.01) |
| G01V 1/40 | (2006.01) |
| G01V 3/18 | (2006.01) |
| G01V 5/04 | (2006.01) |
| G01V 9/00 | (2006.01) |
| G01V 3/20 | (2006.01) |
| E21B 47/00 | (2012.01) |
| G01V 3/02 | (2006.01) |

(52) U.S. Cl.
CPC ............ *G01V 3/20* (2013.01); *E21B 47/00* (2013.01); *G01V 3/02* (2013.01)

(58) Field of Classification Search
CPC .. A61K 45/06; A61K 31/444; A61K 31/4709; A61K 31/56; A61K 38/00; A61K 31/519; A61K 31/196; A61K 31/454; A61K 31/7028; A61K 31/713; A61K 38/08; A61K 49/0002; A61K 51/0478; A61K 51/0482; G01D 4/006; G01D 4/02; G01D 5/12; H04Q 2209/60; H04Q 9/00; H04Q 2209/40; H04Q 2209/43; H04Q 2209/50; H04Q 2209/823; H04Q 2209/883; C07D 401/12; C07D 498/22; C07D 405/12; C07D 498/16

See application file for complete search history.

(56) References Cited

U.S. PATENT DOCUMENTS 5,346,307 A * 9/1994 Ramirez ................ G01K 13/00
324/715

OTHER PUBLICATIONS

International Search Report/Written Opinion for International Application No. PCT/US2015/030151, International filing date May. 11, 2015, dated Aug. 4, 2015.

(Continued)

*Primary Examiner* — Roy Y Yi

(74) *Attorney, Agent, or Firm* — Derek H. Maughan

(57) ABSTRACT

A method of imaging electrical conductivity distribution of a subsurface containing metallic structures with known locations and dimensions is disclosed. Current is injected into the subsurface to measure electrical potentials using multiple sets of electrodes, thus generating electrical resistivity tomography measurements. A numeric code is applied to simulate the measured potentials in the presence of the metallic structures. An inversion code is applied that utilizes the electrical resistivity tomography measurements and the simulated measured potentials to image the subsurface electrical conductivity distribution and remove effects of the subsurface metallic structures with known locations and dimensions.

20 Claims, 18 Drawing Sheets

(56) References Cited

OTHER PUBLICATIONS

Ramirez, A., et al., Detection of Leaks in Underground Storage Tanks Using Electrical Resistance Methods, Journal of Environmental and Engineering Geophysics, 1, 3, 1996, 189-203.

Liu, X -D., et al., A Boundary Condition Capturing Method for Poisson's Equation on Irregular Domains, Journal of Computational Physics, 160, 2000, 151-178.

Bhagwan, J., et al., Electric Drill Stem Telemetry, IEEE Transactions on Geoscience and Remote Sensing. vol. GE-20, No. 2, Apr. 1982, 193-197.

Gunther, T., et al., Three-dimensioional modelling and invesrsion of dc resistivity data incorporating topography—II. Inversion, Geophysics J. Int., 166, 2006, 506-517.

Hou, S., et al. A numberical method for solving variable coefficient elliptic equation with interfaces, Journal of Computational Physics, 202, 2005, 411-445.

Johnson, T. C. et al. Improved hydrogeophiysical characterization and monitoring through parallel modeling and inversion of time-domain resistivity and induced-polarization data, Geophysics, vol. 75, No. 4, 2010, WA27-WA41.

Johnston, R. H., et al., Resistivity Response of a Homogeneous Earth with a Finite-Length Contained Vertical Conductor, IEEE Transactions on Geoscience and Remote Sensing, vol. GE-24, No. 4, 1987, 414-421.

Kafafy, R., et al., Three-dimensional immersed finite element methods for electric field simulation in composite materials, International Journal for Numerical Methods in Engineering, 64, 2005, 940-972.

Klapper, I., et al., A large jump asymptotic framework for solving elliptic and parabolic equiatins with interfaces and strong coefficient discontinuities, Applied Numerical Mathematics, 57, 2007, 657-671.

Leveque, R. J., et al., The Immersed Interface Method for Elliptic Equiations with Discontinuous Coefficients and Singular Sources, Siam Journal on Numerical Analysis, vol. 31, No. 4, 1994, 1019-1044.

Liu, X-D., et al., A boundary Condition Capturing Methods for Poisson's Equation on Irregular Domains, Journal of Computational Physics, 160, 2000, 141-178.

Loke, M. H., et al., Recent developments in the direct-current geoelectrical imaging method, Journal of Applied Geophysics, 95, 2013, 135-156.

Revil, A., et al., Nature of surface electrical conductivity in natural sands, sandstones, and clays, Geophysical Research Letters, vol. 25, No. 5, 1998, 691-694.

Revil, A., et al., Review: Some low-frequency electrical methods for subsurface characterization and monitoring in hydrogeology, Hydrogeology Journal, 20, 2012, 617-658.

Rucker, D. F., Enhanced resolution for long electrode ERT, Geophysical Journal International, 191, 2012, 101-111.

Rucker, D. F., et al., Pilot-scale field validation of the long electrode electrical resistivity tomography method, Geophysical Prospecting, 60, 2012, 1150-1166.

Rucker, D. F., et al., Environmental monitoring of leaks using time-lapsed long electrode electrical resistivity, Journal of Applied Geophysics, 74, 2011, 242-254.

Rucker, D. F., et al., Electrical-resistivity characterization of an industrial site using long electrodes, Geophysics, vol. 75, No. 4, 2010, WA95-WA104.

Singha, K., et al., Advances in interpretation of subsurface processes with time-lapse electrical imaging, Hydrological Processes, 2014.

Slater, L., et al., Electrical-hydraulic relationships observed for unconsolidated sediments, Water Resources Research, vol. 38, No. 10, 2013, 31-1-31-13.

Wiegmann, A., et al., The Immersed Interface Method for Nonlinear Differential Equations With Discontinuous Coefficients and Singular Sources, Siam Journal on Numerical Analysis, vol. 35, No. 1, 1998, 177-200.

Yang, D., Finite elements for elliptic problems with wild coefficients, Mathematics and Computers in Simulation, 54, 2000, 383-395.

Zhu, T., et al., Resistivity tomography with a vertical line current source and its applications to the evaluation of residual oil saturation, Journal of Applied Geophysics, 73, 2011, 155-163.

* cited by examiner

METHOD OF IMAGING THE ELECTRICAL CONDUCTIVITY DISTRIBUTION OF A SUBSURFACE

STATEMENT REGARDING FEDERALLY SPONSORED RESEARCH OR DEVELOPMENT

This invention was made with Government support under Contract DE-AC05-76RL01830 awarded by the U.S. Department of Energy. The Government has certain rights in the invention.

TECHNICAL FIELD

This invention relates to electrical resistivity tomography (ERT) imaging. More specifically, this invention relates to ERT imaging of a subsurface containing metallic structures with known locations and dimensions.

BACKGROUND

Direct current electrical resistivity tomography (ERT) is a robust and well proven method of characterizing and monitoring the subsurface distribution of bulk electrical conductivity (Revil et al., 2012, Loke et al., 2013, Kemna et al., 2006). Electrical conductivity is a useful metric for understanding environmentally significant properties and processes because it is governed by pore fluid chemistry, porosity, pore connectivity, saturation, mineralogy, and grain size distribution (Slater and Lesmes, 2002, Revil and Glover, 1998, Lesmes and Friedman, 2005). In some cases, only one of these properties changes significantly in space or time, enabling spatial or temporal changes in ERT-derived bulk conductivity to characterize the property or process in a relatively unique manner.

ERT works by injecting current into the subsurface across a pair of electrodes, and measuring the corresponding electrical potential response across another pair of electrodes. Many such measurements are strategically taken across an array of electrodes to produce an ERT data set. These data are then processed through a computationally demanding process known as inversion to produce an image of the subsurface conductivity structure that gave rise to the measurements. Data can be inverted to provide 2D images, 3D images, or in the case of time-lapse 3D imaging, 4D images.

Spatial and/or temporal changes in conductivity caused by anthropogenic sources often originate from or are interspersed with buried metallic infrastructure (e.g. transfer pipes, well casings, and storage tanks). Being highly conductive, such infrastructure naturally tends to dominate and degrade ERT images, reducing or eliminating the utility of ERT imaging under otherwise favorable conditions. The forward model, a critical computational component of ERT imaging, is used to simulate ERT data. As discussed further herein, the forward model is the numerical solution to the Poisson equation, which provides the subsurface electrical potential arising from a known source of current and known conductivity distribution discretized within a numerical grid or mesh. Several authors have approached aspects of the infrastructure problem by modeling metallic well casings as a line of highly conductive cells relative to the background material (Zhu and Feng, 2011, Daily et al., 2004b, Daily et al., 2004a, Ramirez et al., 1996, Rucker, 2012, Rucker et al., 2012, Rucker et al., 2011, Rucker et al., 2010). Rucker et al., (2010) described the general approach, whereby vertically stacked rectangular cells of high conductivity are used to approximate a metallic well casing. To model the casing as a long current source electrode, a point source is placed within one of these cells, and the numerical solution is expected to adequately approximate current flow through the wellbore, and the corresponding constant potential that develops along the casing. The numerical inaccuracies with this approach for a large jump in conductivity at the wellbore interface are well documented (Hou and Liu, 2005, Kafafy et al., 2005, Liu et al., 2000, Yang, 2000). Namely, the conductive discontinuity at the wellbore causes the forward solution matrix to become ill-conditioned, with a condition number proportional to $\sigma_{metal}/\sigma_{soil}$, where $\sigma_{metal}$ and $\sigma_{soil}$ are respectively the conductivity of the well casing and the conductivity of the host material (Klapper and Shaw, 2007). For example, Rucker et al., (2010) noted inaccurate modeling results when modeling the wellbore at 10,000 S/m within a 0.01 S/m host material. To compensate, they used a wellbore conductivity of 167 S/m meter, noting that this provided the most accurate match to the analytic solution for a homogeneous halfspace. Actual conductivities for common metallic wellbore materials range from $1\times10^6$ to $7\times10^6$ S/m. Other infrastructure modeling applications to date include the work of Rücker and Günther (2011), who demonstrated an approach for accurately modeling non-point electrodes, but their method does not account for the influence of metallic objects which are not used as electrodes.

Forward models using the direct modeling approach described above on an orthogonal mesh suffer from another disadvantage in that arbitrary shapes of metallic structures are difficult to efficiently model, particularly considering the finely divided meshes necessary to model pipes and wells in true dimension. In addition, the direct modeling approach cannot accommodate situations where metallic structures are discontinuous in space, but electrically connected (e.g. buried tanks connected by above-ground piping, buried pipes with electrically insulated segments etc.). ERT is generally not well suited for environments with buried electrically conductive infrastructure such as pipes, tanks, or well casings, because these features tend to dominate and degrade ERT images. This reduces or eliminates the utility of ERT imaging where it would otherwise be highly useful for, for example, imaging fluid migration from leaking pipes, imaging soil contamination beneath leaking subsurface tanks, and monitoring contaminant migration in locations with dense networks of metal cased monitoring wells. Ignoring or inaccurately modeling metallic infrastructure is a significant source of forwarding modeling error. In practice, such errors compromise imaging results because the imaging algorithm compensates for forward modeling errors by incorrectly recovering the subsurface conductivity distribution.

The capability to produce ERT images with confidence in the presence of conductive infrastructure could be better assessed and significantly improved, through more accurate forward modeling. What is needed is a method of imaging the subsurface electrical conductivity distribution that removes the effects of the subsurface metallic structures.

SUMMARY

The present invention provides computational methods for ERT imaging of subsurfaces containing metallic structures with known locations and geometry.

In one embodiment of the present invention, a method of imaging electrical conductivity distribution of a subsurface containing metallic structures with known locations and dimensions is disclosed. The method includes injecting electrical currents into the subsurface and measuring the resulting electrical potentials using multiple sets of electrodes, thus generating electrical resistivity tomography measurements. The method further includes applying a numeric code to simulate the measured potentials in the presence of the metallic structures. The method also includes applying an inversion code that utilizes the electrical resistivity tomography measurements and the simulated measured potentials to image the subsurface electrical conductivity distribution and remove effects of the subsurface metallic structures with known locations and dimensions.

In one embodiment, the numeric code is a forward model.

In one embodiment, applying the forward model to simulate the subsurface potentials comprises a solution to a Poisson equation.

The Poisson equations include, but are not limited to, at least one of the following: integral calculations, analytical calculations, numerical calculations, partial solutions calculations, digital calculations, and an immersed interface boundary condition solution.

In one embodiment, the inversion code is applied so that the simulated electrical potentials match actual measured electrical potentials in the presence of the metallic structures.

In one embodiment, applying the inversion code includes generating an electrical conductivity distribution that minimizes error between the simulated electrical potentials and the actual potentials measured in the presence of the metallic structures.

In one embodiment, applying the forward model and the inversion produces a reconstructed three-dimensional image of the subsurface electrical conductivity, while removing the effects of the subsurface metallic structures.

The electrodes are, but not limited to, at least one of the following: surface electrodes, well casing electrodes, arrays of point buried electrodes, and the metallic structures with known locations and dimensions.

In one embodiment, a boundary of each metallic structure is represented by nodes, faces, or segments of unstructured tetrahedral elements.

In another embodiment of the present invention, a method of imaging electrical conductivity distribution of a subsurface containing metallic structures with known locations and dimensions is disclosed. The method includes injecting current and measuring the electrical potential of the subsurface with multiple sets of electrodes in the presence of the metallic infrastructures, thus generating electrical resistivity tomography measurements. The method also includes applying a forward model to generate an electrical conductivity distribution that minimizes error between the simulated electrical potentials and actual measured electrical potentials, while removing the effects of the metallic structures.

In another embodiment of the present invention, a method of imaging electrical conductivity distribution of a subsurface containing metallic structures with known locations and dimensions is disclosed. The method includes injecting electrical currents into the subsurface and measuring the resultant electrical potentials using multiple sets of electrodes, thus generating electrical resistivity tomography measurements. The method further includes solving a set of Poisson equations to simulate the measured potentials in the presence of the metallic structures, wherein a boundary of each metallic structure is represented by nodes, faces, or segments of unstructured tetrahedral elements. The method also includes applying an inversion code that utilizes the measured potential and the simulated potentials to produce a reconstructed three-dimensional image of the subsurface electrical conductivity in the presence of the subsurface metallic structures.

DETAILED DESCRIPTION OF THE PREFERRED EMBODIMENTS

The present invention relates to methods and systems of imaging the electrical conductivity distribution of a subsurface containing metallic structures with known locations and dimensions. In one embodiment of the present invention, the method accurately accommodates the large conductivity contrast typically existing between subsurface host materials and buried metallic structures. In one embodiment, the global solution to the Poisson equation is decoupled at the metallic boundaries into a series of well-conditioned partial solutions. Each partial solution is then scaled to honor known current flux conditions based on the divergence theorem. Finally, the partial solutions are superimposed to form the global solution.

In addition, other advantages of the present invention include, but are not limited to, the following: 1) the solution can be formulated on an unstructured tetrahedral mesh, enabling arbitrary shapes to be accommodated efficiently; 2) discontinuous structures that are electrically connected can be easily accommodated; 3) metallic objects can be used as current sources and/or potential measurement electrodes; 4) no special requirements or adjustments are required for the inversion problem; and 5) a method of singularity removal may be provided without the necessity of an analytic solution (Weigmann and Bube, 1998), and 6) the method or algorithm can be implemented in parallel to accommodate the computational demands of 3D imaging. With respect to computational requirements, an additional forward solution may be provided for each distinct metallic object, which is the computational equivalent of adding one point source electrode to the inversion algorithm.

In one example, the present invention allows for the imaging of contaminated soil beneath a leaking tank using surface electrodes, well casing electrodes, and/or vertical arrays of point source electrodes. The capability to accurately model infrastructure with known dimensions and location—as described in the present invention—enables ERT imaging to be accurately assessed and executed.

Subsurface Electrical Potential

Figure 1:
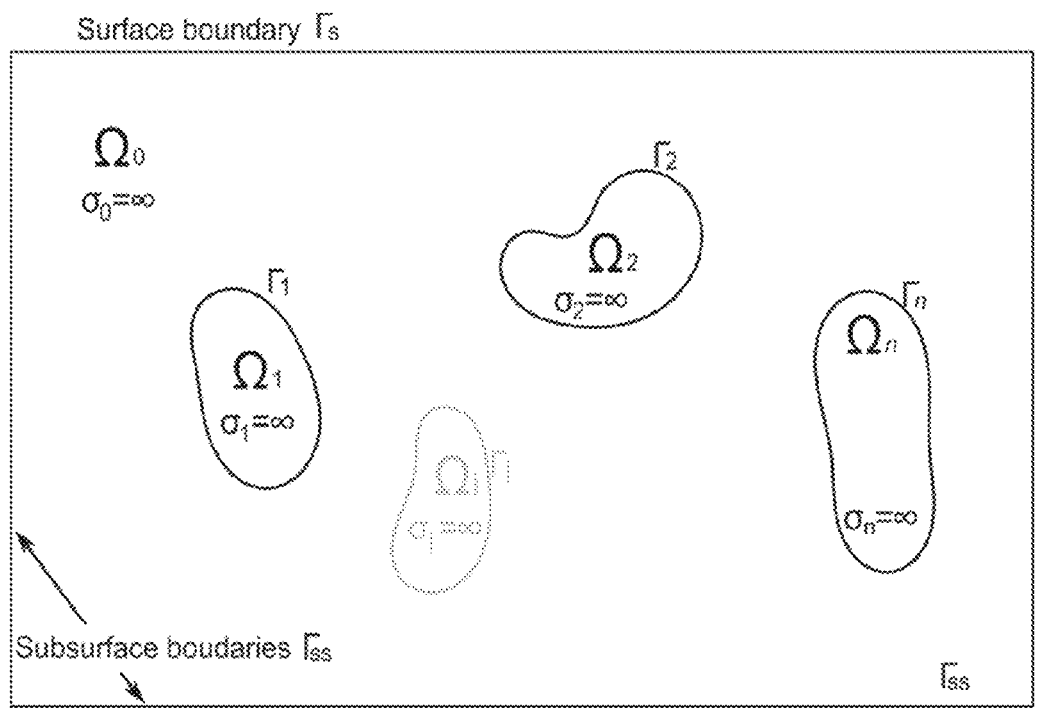
FIG. 1 shows a diagram of a general subsurface region containing infinitely conductive inclusions $\Omega_1 \ldots \Omega_n$, with surface boundaries $\Gamma_1 \ldots \Gamma_n$, embedded within a finite conductivity host medium $\Omega_0$ with electrical conductivity $\sigma_0$.

The direct-current electrical potential arising from a given current source is given by the Poisson equation:

$$\nabla \cdot \sigma(r) \nabla \phi(r) = J(r) \qquad \text{eq. (1)}$$

where r is a position vector, $\sigma$ is electrical conductivity, $\phi$ is electrical potential, and J is the source current density. Given $\sigma$, J and appropriate boundary conditions, the objective of the forward model is to solve equation 1 for $\phi$, which is measured at known electrode locations during an ERT experiment. Consider the general subsurface region $\Omega$ which is comprised of a background sub-region $\Omega_0$ with electrical conductivity $\sigma_0(r)$, and n sub-regions $\Omega_1 \ldots \Omega_n$ with infinite conductivity, such that the potential in each sub-region has a unique, constant potential, designate $\phi_1 \ldots \phi_n$ as shown in FIG. 1. In this example, the surface boundary ($\Gamma_s$) condition is Neumann, whereby the current flux normal to the surface boundary is zero. In this example, the subsurface boundary conditions are Dirichlet ($\Gamma_{ss}$), and specify zero potential on each subsurface boundary. In practice, the subsurface boundaries of the computational mesh are placed far from the region of interest to approximate zero potential at infinite distance. The sub-regions $\Omega_1 \ldots \Omega_n$ represent (for example) electrically conductive well casings, pipes, or tanks with known location and dimension that are assumed to have infinite conductivity. The error introduced by the infinite conductivity assumption is insignificant under most circumstances, as discussed below.

The solution to equation 1 under the conditions shown in FIG. 1 is computed herein using, as one example, a specific application of the more general framework described by Klapper and Shaw (2006), which provides a generalization of the immersed interface boundary condition method for accommodating large coefficient discontinuities in the numerical solutions of elliptic and parabolic equations. In one embodiment, the global solution $\phi$ is generated by 1) solving a series of well-conditioned partial solutions that are decoupled at the discontinuous conductivity boundaries (i.e., $\Gamma_1 \ldots \Gamma_n$), 2) scaling the partial solutions to honor a set of known current flux conditions, and 3) superimposing the partial solutions to provide the global solution. Below is shown the development for the global solution arising from a single current source with a current sink at infinite distance from the source, termed herein the pole solution. To simulate an ERT data set, one such solution is generated for every electrode used as a current source or sink. The total potential for any source-sink electrode pair may then be generated by subtracting the pole solution for the current sink electrode from the pole solution for the current source electrode. This approach provides a significant computational savings over explicitly computing the global solution for each measurement, the number of which is typically much larger than the number of current source electrodes.

The pole solution for a point electrode located in $\Omega_0$ comprises n+1 partial solutions, one for the electrode and one for each of the n infinite conductivity sub-regions. The partial solution for region $\Omega_0$ ($\phi_0$) is given by solving:

$$\nabla \cdot \sigma(r) \nabla \phi_0(r) r \in \Omega_0$$

$$\phi(r) = 0 \ r \in \Gamma_1 \ldots \Gamma_n$$

$$\sigma(r) \nabla \phi(r) \cdot \hat{n} = 0 \ r \in \Gamma_s$$

$$\phi(r) = 0 \ r \in \Gamma_{ss} \qquad \text{eq. (2)}$$

where $\hat{n}$ is the unit normal vector to the corresponding surface. In equation 2, the partial solution in region $\Omega_0$ is computed for given current source in $\Omega_0$ (e.g. an electrode point source), with the potential at each infinite-conductivity boundary set to zero, and the outer boundary conditions as previously specified.

The partial solution ($\phi_j$, j=1 ... n) for region $\Omega_0$, is given by solving:

$$\nabla \cdot \sigma(r) \nabla \phi_j(r) = 0 \ r \in \Omega_0$$

$$\phi(r) = 0 \ r \in \Gamma_1 \ldots \Gamma_n, r \notin \Gamma_j$$

$$\phi(r) = 1 \ r \in \Gamma_j$$

$$\sigma(r) \nabla \phi(r) \cdot \hat{n} = 0 \ r \in \Gamma_s$$

$$\phi(r) = 0 \ r \in \Gamma_{ss} \qquad \text{eq. (3)}$$

The solution to equation 3 provides the potential in $\Omega_0$ given a unit potential on the infinite conductivity boundary $\Gamma_j$, zero potential on the remaining infinite conductivity boundaries, and outer boundary conditions as previously specified.

The partial solutions $\phi_0 \ldots \phi_n$ provide the basis desired to construct the global solution. However, direct superposition of $\phi_0 \ldots \phi_n$ will provide a global solution that violates the known flux conditions through each infinite conductor. Those conditions are given by the divergence theorem, which specifies:

$$\int_{\Gamma_j} \sigma(r) \nabla \phi(r) \cdot \hat{n} dS = \int_{\Omega_j} J(r) dV \qquad \text{eq. (4)}$$

In this work there are two possible source conditions for equation 4. In the first case there is no current source within $\Omega_j$, and the right hand side of equation 4 is zero. This represents the case were $\Omega_j$ is not being used as a current source electrode. When region $\Omega_j$ is the current source electrode, the right hand side of equation 4 is set to one in order to simulate ERT potential measurements which are typically normalized to one unit of injected current.

The partial solutions are assembled to form the global solution by the equation:

$$\phi(r) = \phi_0(r) + \Sigma_{j=1}^n C_j \phi_j(r) \qquad \text{eq. (5)}$$

where the scaling factors $C_j$ are chosen to satisfy the flux conditions specified by equation 4. The scaling factors are determined by solving the matrix equation:

$$\begin{bmatrix} f_{1,1} & f_{1,2} & \cdots & f_{1,n} \\ f_{2,1} & & & \\ \vdots & & \ddots & \\ f_{2,n} & & & f_{n,n} \end{bmatrix} \begin{bmatrix} C_1 \\ C_2 \\ \vdots \\ C_n \end{bmatrix} = \begin{bmatrix} F_1 \\ F_2 \\ \vdots \\ F_n \end{bmatrix} \qquad \text{eq. (6)}$$

where $f_{i,j}$ is the current flux through $\Omega_i$ arising from $\phi_j(r)$, computed as described in the forthcoming sections. $F_i$ is chosen to satisfy equation 4. For example, if the current source is a point electrode within $\Omega_0$, then:

$$F_i = -f_{i,0}, \; i=1 \ldots n \qquad \text{eq. (7)}$$

so that the net current flux out of $\Omega_i$, $i=1 \ldots n$ arising from $\phi_0$ is negated by the cumulative current flux out of $\Omega_i$, $i=1 \ldots n$ arising from $C_j\phi_j(r)$, $j=1 \ldots n$.

If region $\Omega_k$, $k=1 \ldots n$ is a non-point current injection electrode, then:

$$F_i = 0, \text{ if } i \neq k$$

$$F_i = 1, \text{ if } i = k \qquad \text{eq. (8)}$$

so that the net current flux from $\Omega_k$ is one unit, and the current flowing out of the remaining infinite conductivity regions is zero. Note also that in this case, $\phi_0(r)$ is zero because there is no current source within $\Omega_0$.

Let np be the number of point source electrodes and nnp be the number of non-point source electrodes used to generate an ERT survey. Inspection of equations 2 through 6 reveals that the forward simulation for an ERT survey requires np solves of equation 2 (one for each point source electrode), n solves of equation 3 (one for each infinite conductivity region), and np+nnp solves of equation 6 (one for each non-point current source).

Numerical Solution

Figure 5A:
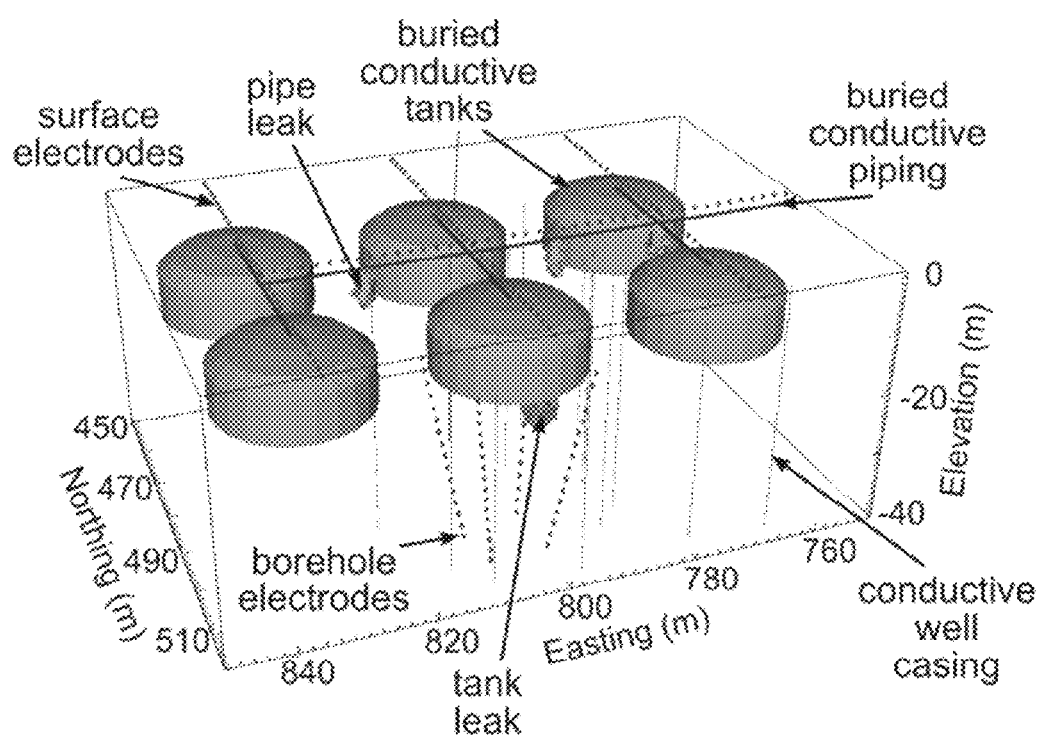
FIG. 5A shows a conceptual model of a system of buried metallic storage tanks, transfer pipes, and monitoring wells.
Figure 5B:
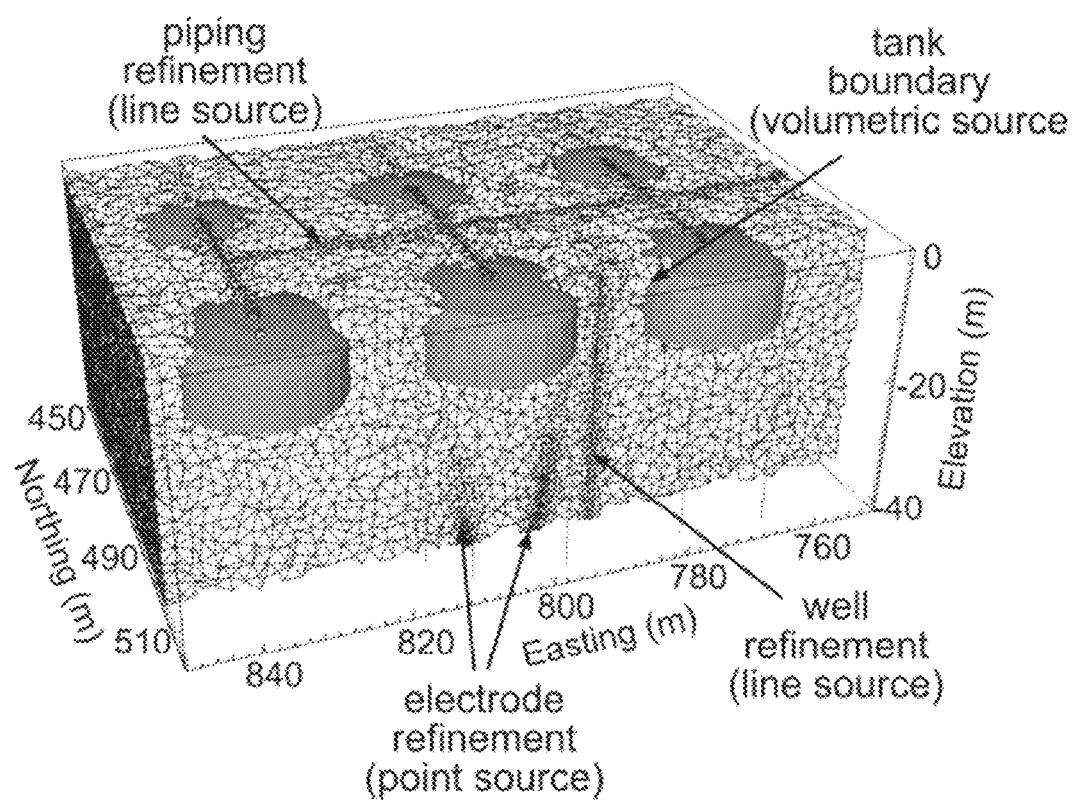
FIG. 5B is a cutout of the computational mesh used to model the system of FIG. 5A.

Equations 2 and 3 are discretized and solved using the weak form finite element solution on an unstructured tetrahedral mesh (Gunther et al., 2006). The unstructured mesh enables arbitrary shapes to be accommodated, and facilitates efficient modeling of complex structures (e.g. piping systems, buried tanks etc.). Potentials are computed on the nodes of the mesh, and conductivities are specified on the mesh elements, each element being formed by four bounding nodes. As will be shown, linear structures (e.g. pipes, wellbore casings) can be accurately modeled as a series of connected nodes (e.g. a line source), and 2D structures (e.g. sheet piles or other planar metallic barriers) can be modeled as a mesh of connected nodes (e.g. a planar source). In addition, because the potential of an infinite conductivity feature is everywhere equal, it is only necessary to model the boundary of 3D structures, with boundary conditions as described in the previous section. Thus only the shells of 3D structures are incorporated into the computational mesh, the internal structure being hollow. FIG. 5B shows an example of a computational mesh incorporating buried tanks, pipes, and well casings that will be used in the forthcoming synthetic modeling and inversion demonstration.

Flux Computations

To solve equation 6 for the flux scaling factors ($C_j$), the current flux terms $f_{i,j}$ comprising the left hand side matrix is computed. It is well known that finite element flux computations are globally conservative, but locally non-conservative, eliminating the possibility of computing $f_{i,j}$ by the weak form finite element solution. Instead, localized control volume finite element (CVFM) computations (Voller; 2009) are used to compute the flux through each infinite conductivity inclusion.

Figure 2:
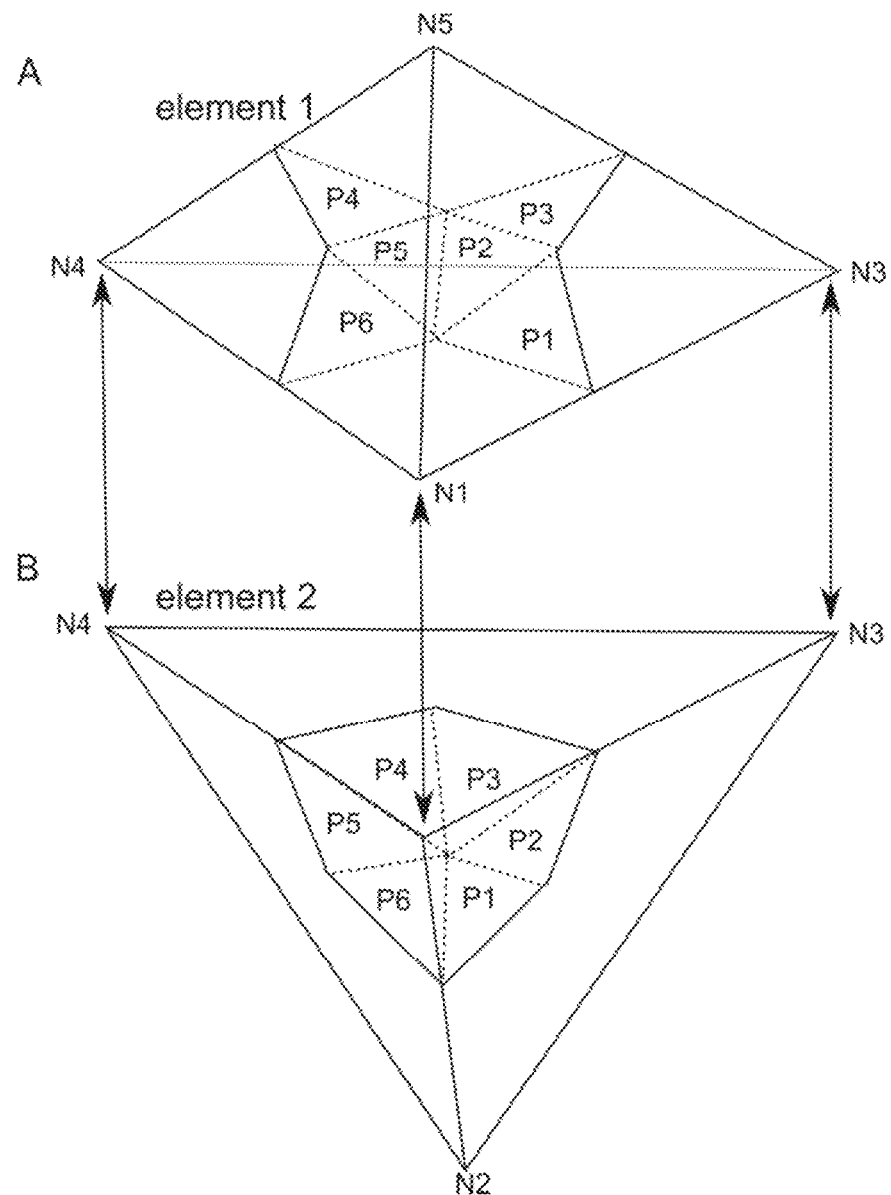
FIG. 2 shows two types of tetrahedral elements that can form a boundary, along with corresponding interior planes (P1-P6) used for local CVFM current flux computations through an infinite conductivity inclusion.

To illustrate the CVFM computations, consider the neighboring tetrahedral elements A and B shown in FIG. 2, which illustrate the two types of elements that can bound a point, line, plane, or volume representing an infinite conductivity feature. Element A illustrates the case where only two nodes of the element lie on an infinite conductivity boundary (N3 and N4, or N1 and N5). Element B illustrates the case where either three nodes (N2, N3, or N4), or 1 node (N1), lies on the boundary. Note that it is not possible for all four nodes to lie on the boundary with a non-degenerate tetrahedron. Typically many elements of types A and B will be combined to bound a given infinite conductivity structure.

In the CVFM method, six sub-planes (P1-P6) are formed within each bounding element by connecting segment midpoints, element face centroids, and the nodal centroid in the case of element B as shown in FIG. 2. These subplanes are defined on every element having nodes that bound an infinite conductivity surface $\Gamma_i$. As a whole, they form a closed boundary around $\Omega_i$ by which the left hand side of equation 4 may be approximated to compute $f_{i,j}$. To illustrate, let e represent an element bounding $\Omega_i$, and let ne be the total number of elements bounding $\Omega_i$. Equation 4 is approximated by:

$$\int_{\Gamma_i} \sigma(r) \nabla \phi(r) \cdot \hat{n} dS \approx \sum_{e=1}^{ne} \sigma_e \sum_{p=1}^{6} A_{e,p} \langle \nabla \phi_{e,j}, \hat{n}_{e,p} \rangle = f_{i,j} \qquad \text{eq. (9)}$$

where $\sigma_e$ is the conductivity of element e, $A_{e,p}$ is the area of plane p in element e, $\phi_{e,j}$ is the potential within element e arising from source j, $\hat{n}_{e,p}$ is the outward pointing normal vector of plane p in element e, and $\langle \; \rangle$ represents the inner product. Note that $\phi_{e,j}$ is a solution of equation 2 or 3 as described above, and $\nabla \phi_{e,j}$ is constant within each element, computed using the linear finite element shape functions for each element. In words, equation 9 computes and sums the outward flux flowing through every subplane to provide the total net flux flowing through $\Omega_i$ due to the potential field $\phi_j(r)$. For computational efficiency, equation 9 is reduced to the form:

$$f_{i,j} = \sum_{e=1}^{ne} \sigma_e \sum_{k=1}^{4} K_{e,k,i} \phi_{e,k,j} \qquad \text{eq. (10)}$$

where k spans the four nodes in element e, $\phi_{e,k,j}$ is the simulated potential in node k of element e, arising from source j, and $K_{e,k,i}$ is row e and column k of a flux computation matrix $K_i$ formed to account for the geometric terms of equation 9 for region $\Omega_i$. Since $K_i$ depends only on the mesh geometry, it is computed only once, and provides a means to efficiently compute the net flux through $\Omega_i$ given any potential field $\phi_j(r)$ and conductivity distribution $\sigma(r)$. As shown below, computation of $K_i$ facilitates efficient computation of the forward problem in the parallel algorithm. This is particularly helpful in the inverse problem, where the forward problem must be solved multiple times.

Parallel Implementation

To summarize, steps to compute the forward solution include:

1. Compute the np point source partial solutions $\phi_0(r)$, one for each point electrode (equation 2).

2. Compute the n non-point partial solutions $\phi_j(r)$, j=1 . . . n, one for each infinite conductivity region (equation 3).

3. Using the partial solutions computed in parts 1 and 2, compute the np+npp solutions to equation 6, one for each np point source/sink electrode and each npp non-point current source/sink electrode.

4. Construct the np+npp pole solutions using equation 5.

5. Superimpose appropriate pole solutions and extract potentials to construct simulated measurements.

Steps 1 through 5 are amenable to parallel computation. The parallel algorithm described herein uses a master/slave configuration (Johnson et al., 2010), whereby a single master process handles input/output and orchestrates computations. One or more slave processes handle the primary computational burdens, message passing, and memory requirements.

Figure 3:
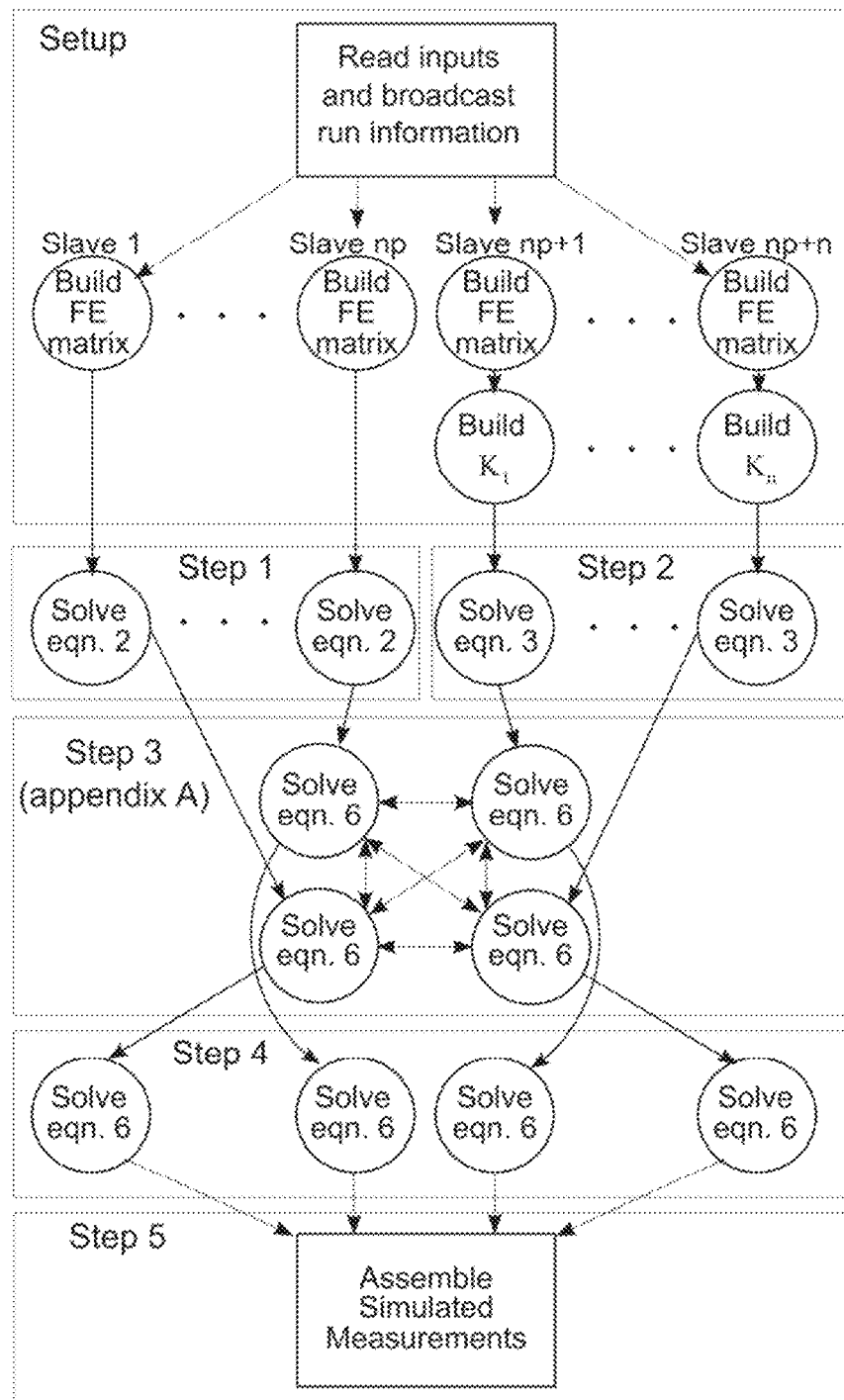
FIG. 3 shows a flow diagram illustrating the parallel computation of a forward simulation.

For the sake of simplicity, assume one slave process is assigned to each of the np point source electrodes, and to each of the n infinite conductivity regions. FIG. 3 shows a flow diagram illustrating the parallel computation of a forward simulation. Rectangles represent the master process and circles represent slave processes. Each slave step is perfectly parallel—no inter-process communications are required—except for step 3, which represents a small portion of the overall computational burden, enabling the algorithm to remain highly scalable. In the setup phase the master process reads input information (i.e. computational mesh, electrode locations, measurement sequence etc.) and broadcasts pertinent information to each of the slave processors. The slave processors construct the finite element matrix. The slave processes responsible for infinite conductivity inclusions (slaves np+1 through np+n) also construct the flux computation matrices $K_i$ for regions $\Omega_i$, i=1 . . . n. Steps 1 and 2, whereby the partial solutions for each point electrode source and each infinite conductivity source are computed, are executed at the same time. In step three, message passing between slaves is required in order to efficiently compute the left and right hand sides of equation 6. In step 4, each slave uses equation 5 to compute the pole solution for its corresponding electrode. Finally, in step 5, each slave extracts those potentials necessary to simulate the ERT measurement sequence and sends them to the master process where they are assembled.

In this work the partial solutions (i.e. equations 2 and 3) are not parallelized, enabling the forward computation to remain highly scalable, except for the message passing required in step 3. The matrix equation required to solve equations 2 and 3 is sparse, such that relatively large problems (many millions of elements) can easily be computed stored on the memory typically allocated to a single processor. The message passing requirements to formulate and solve equation 6 are typically small such that the computation burden associated with steps 3 is much smaller than that of steps 1 and 2, even for large numbers of infinite conductivity inclusions. Thus, message passing requirements for the forward simulation are minimal, enabling the algorithm to remain highly scalable.

Inverse Problem

Analytic Solutions

Figure 4:
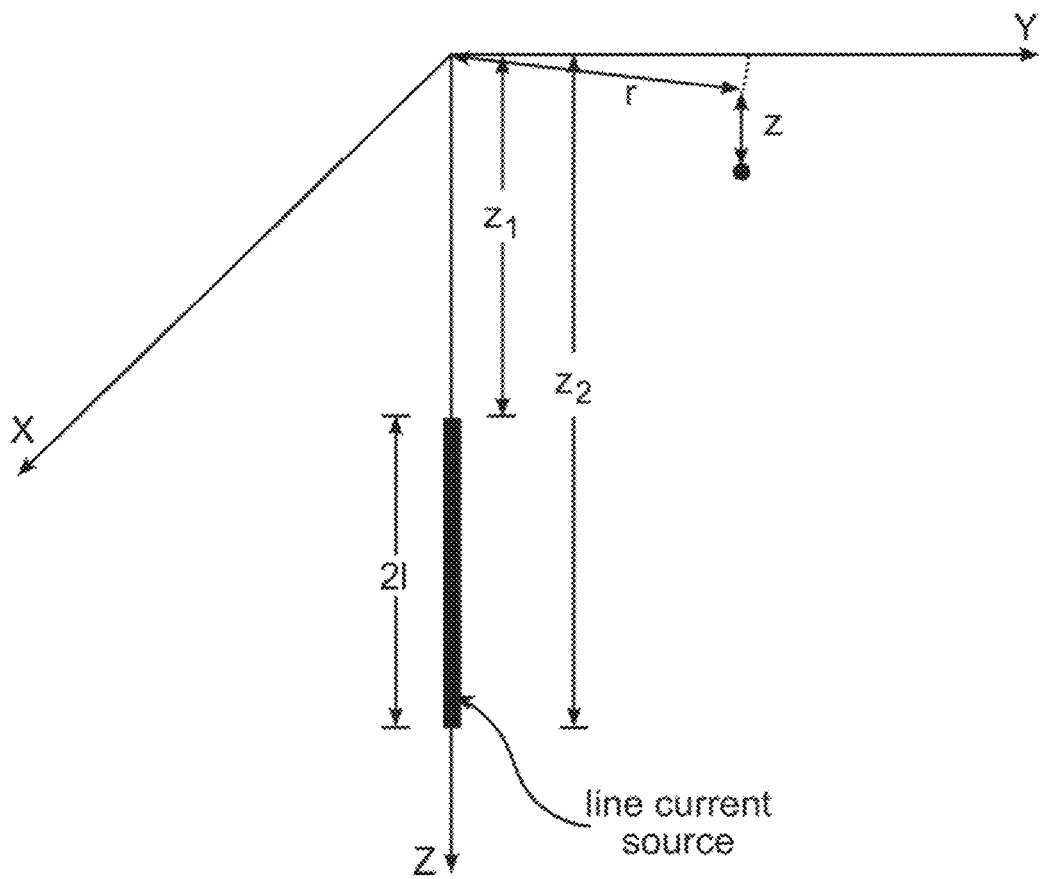
FIG. 4 is a conceptual diagram for the analytic solution to the potential generated at a point from a line source pole current injection.

In the results section numeric forward modeling results using the procedure described above are validated through comparison to analytic solutions for a line source. Referring to FIG. 4, the potential at a point within an infinite medium of homogeneous conductivity caused by a vertical line source whose axis passes through the origin is given by (Wait, 1982, Bhagwan and Trofimenkoff, 1982):

$$\phi(r, z) = \frac{I_s}{8\pi l\sigma} \ln\left[\frac{(z_2 - z) + \sqrt{(z_2 - z)^2 + r^2}}{(z_1 - z) + \sqrt{(z_1 - z)^2 + r^2}}\right] \quad \text{eq. (11)}$$

where $z, z_1, z_2$, l and r are distances as outlined in FIG. 4, $I_s$ is the current source strength of the line source, and $\sigma$ homogeneous conductivity. Using the method of images, the corresponding half space potential is given by:

$$\phi(r, z) = \frac{I_s}{8\pi l\sigma} \quad \text{eq. (12)}$$

$$\ln\left[\frac{(z_2 - z) + \sqrt{(z_2 - z)^2 + r^2}}{(z_1 - z) + \sqrt{(z_1 - z)^2 + r^2}} + \frac{(z_2 + z) + \sqrt{(z_2 + z)^2 + r^2}}{(z_1 + z) + \sqrt{(z_1 + z)^2 + r^2}}\right]$$

where the half-space boundary is located at z=0.

Using equations 11 and 12, a semi-analytic solution for the halfspace potential arising from a point source of current in the presence of a vertical conductor may be derived. The solution is similar to the numeric procedure described above as outlined in detail by Johnston et al 1987. The vertical conductor is divided into a number of small segments, and the current strength of each segment is adjusted so that the total current flux emanating from the line source is perfectly negated by the current flux through the line source that arises from the point source potential, thereby honoring conservation of charge within the conductor. Once the current strength of each segment is known, the potential distribution arising from that segment is computed with equation 12, and the global potential is produced by summing the contributions from each segment with the point source potential.

Synthetic Analysis: Imaging Vadose Zone Contamination in the Presence of Buried Conductive Pipes, Tanks, and Well Casings To demonstrate a real-world application, consider the conceptual model shown in FIG. 5A, which consists of a series of six metallic storage tanks connected together by buried metallic piping, such that the tanks and pipes have the same electrical potential. The pipes are tanks connected physically and electrically to form a single 'electrode' of constant potential. The conductivity of soils surrounding the tanks and pipes is 0.001 S/m, except for the regions where leaks have occurred. The three pipe-leak regions have a conductivity of 0.1 S/m, and the tank leak region has a conductivity of 1.0 S/m. The system also includes 14 metal-cased monitoring wells to a depth of 40 m, distributed as shown in FIG. 5A. The objective of the analysis is to investigate the capability to image the leak zones using 1) surface electrodes deployed directly above the transfer pipes, 2) well casings as long electrodes, and 3) borehole electrodes installed beneath the leaking tank. The surface and borehole electrodes are shown as dots, and well casings are used as electrodes for ERT imaging. The surface array, in this example, consists of 43 electrodes over the main transfer line, and 39 electrodes over each of the three lines connecting to the six tanks, for a total of 160 electrodes at 2m spacing. Each of the four boreholes arrays contains 16 electrodes at 2 m spacing, for a total of 64 electrodes. Wenner array surveys were simulated along each of the four surface lines, for a total of 815 measurements. The borehole survey included a series of 3995 cross-hole dipole-dipole measurements. The well-casing survey comprised every possible unique measurement, including potential measurements on the tank/pipe 'electrode', for a total of 4095 measurements using 15 electrodes (14 wells and 1 tank/pipe electrode).

A cutout of the computational mesh is shown superimposed on the tanks in FIG. 5B. As discussed previously, only the conductive boundary of the tank is included in the mesh, the interior tank regions being hollow. The pipes and wells are modeled as line sources with 0.5 m spacing between each node on the line, which produces a refined mesh around pipe and well locations. The mesh is also refined near point electrodes for modeling accuracy in the high potential gradient regions near electrodes. Mesh boundaries extend far beyond the imaging region (~5000 m) to reduce boundary effects (not shown), with expanding elements to reduce computational demand. In total, the mesh consists of 1,567,844 elements and 254,409 nodes.

Forward modeling and inversion are executed on the same mesh using 161 processors for the surface array simulation, 16 processors for the well-electrode array simulation, and 65 processors for the borehole array simulation. To simulate field conditions, 5% normally distributed noise is added to each measurement.

Results

Figure 6A:
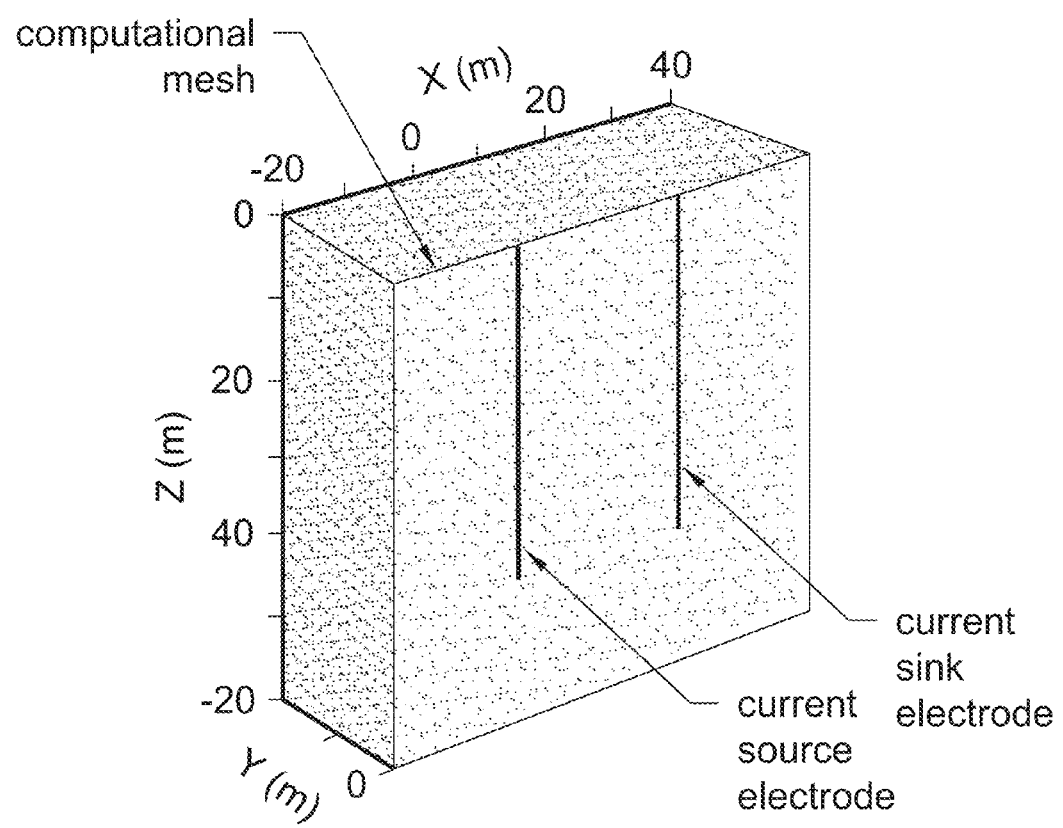
FIG. 6 shows A) computational mesh for current injection between two line sources; B) partial solution for the line source at (0,0) m; C) partial solution for the line source at (20,0) m; D) Analytic solution—or potential distribution per ampere of current injected; E) numeric solution; F) percent error distribution; and G) percent error histogram.
Figure 6B:
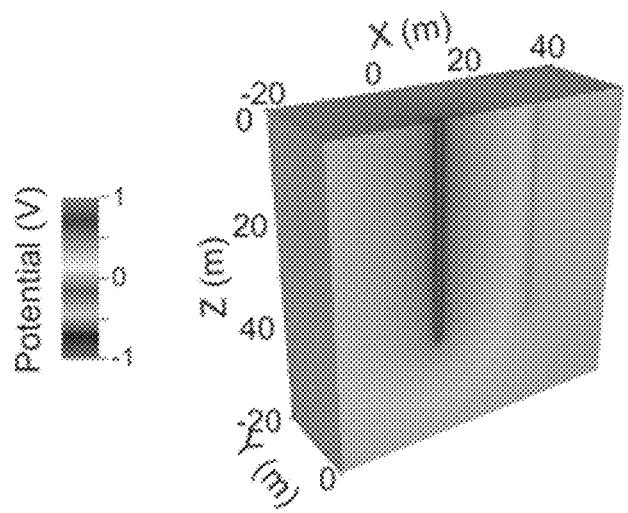
Figure 6C:
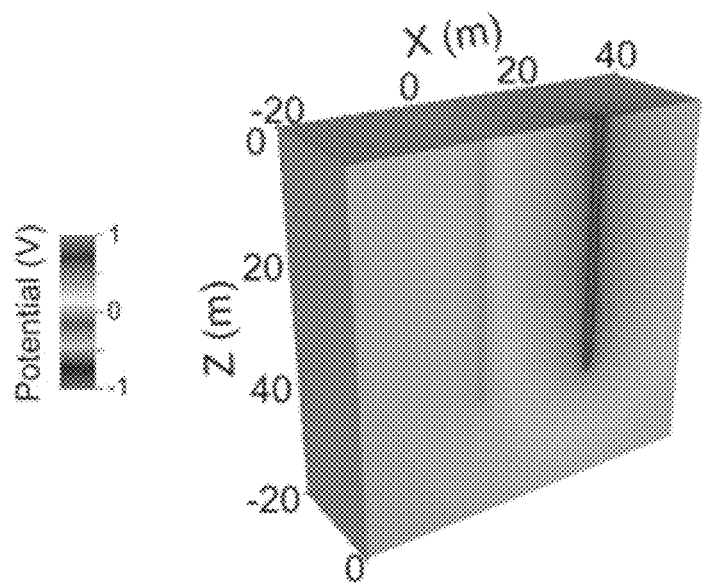
Figure 6D:
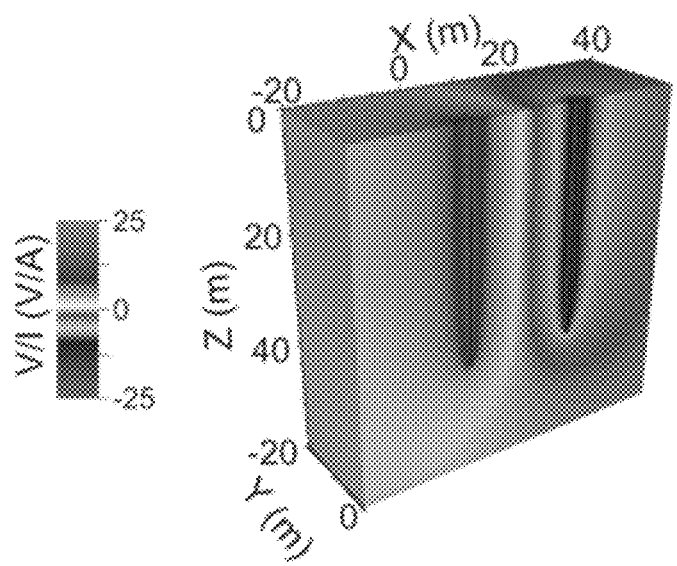
Figure 6E:
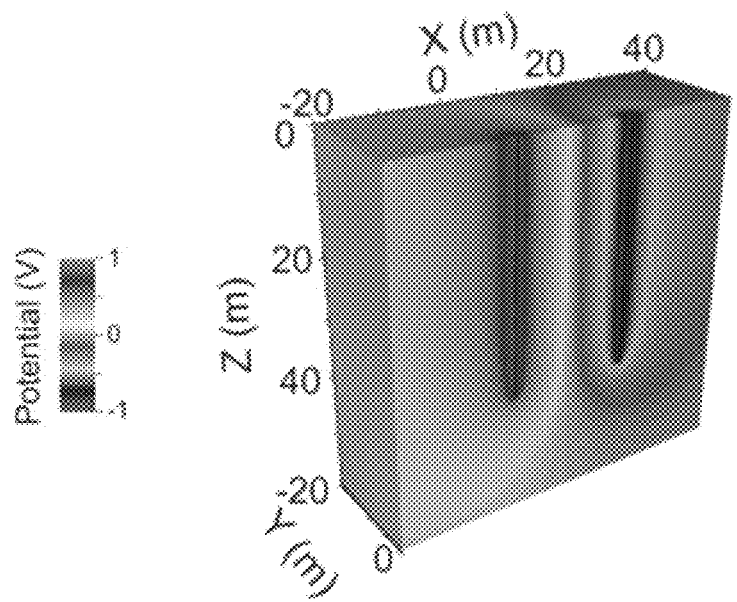
Figure 6F:
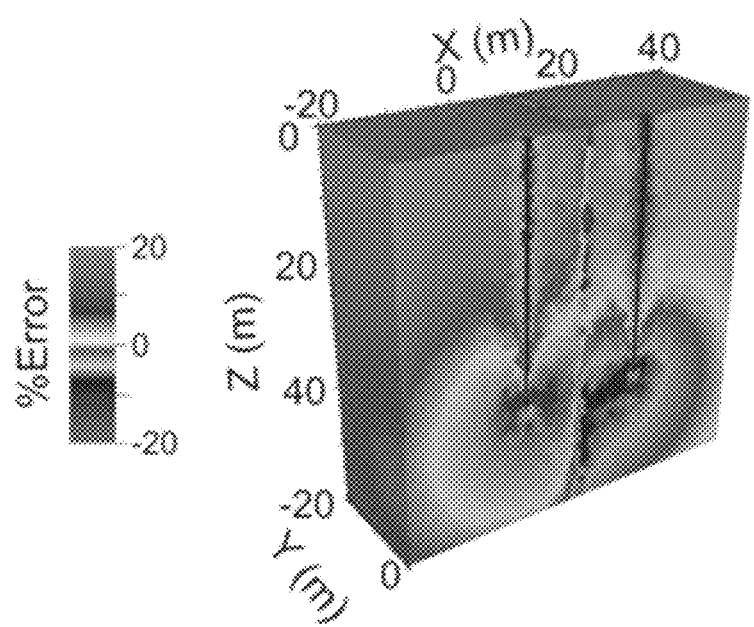
Figure 6G:
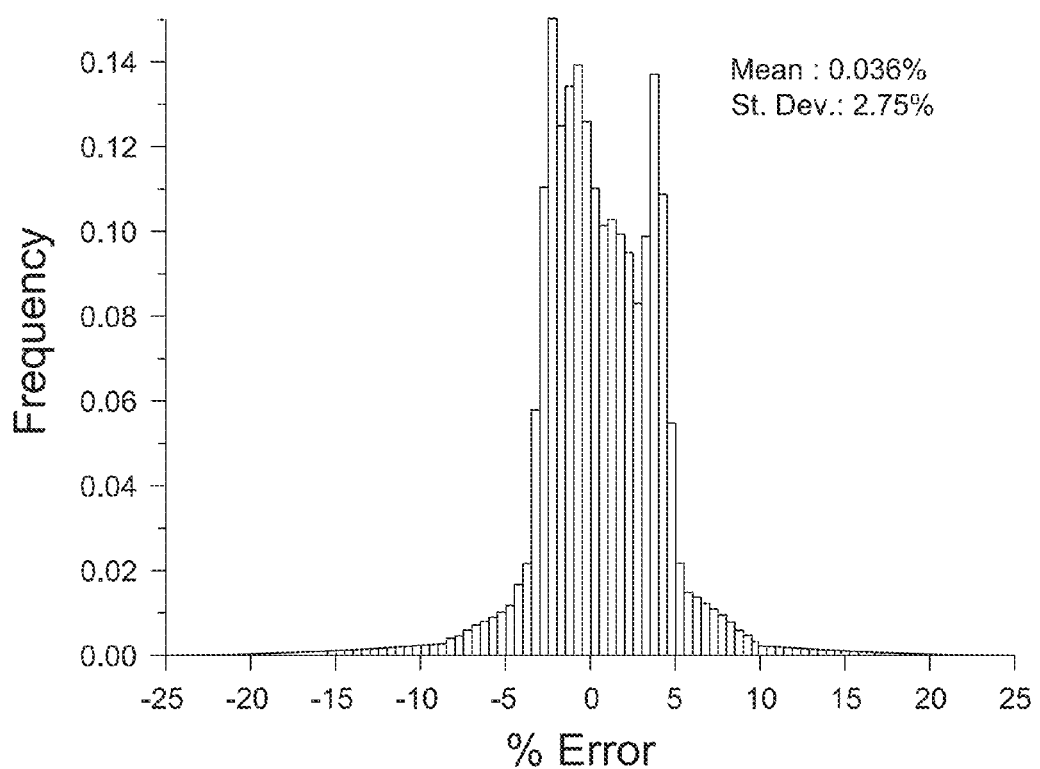
Figure 7A:
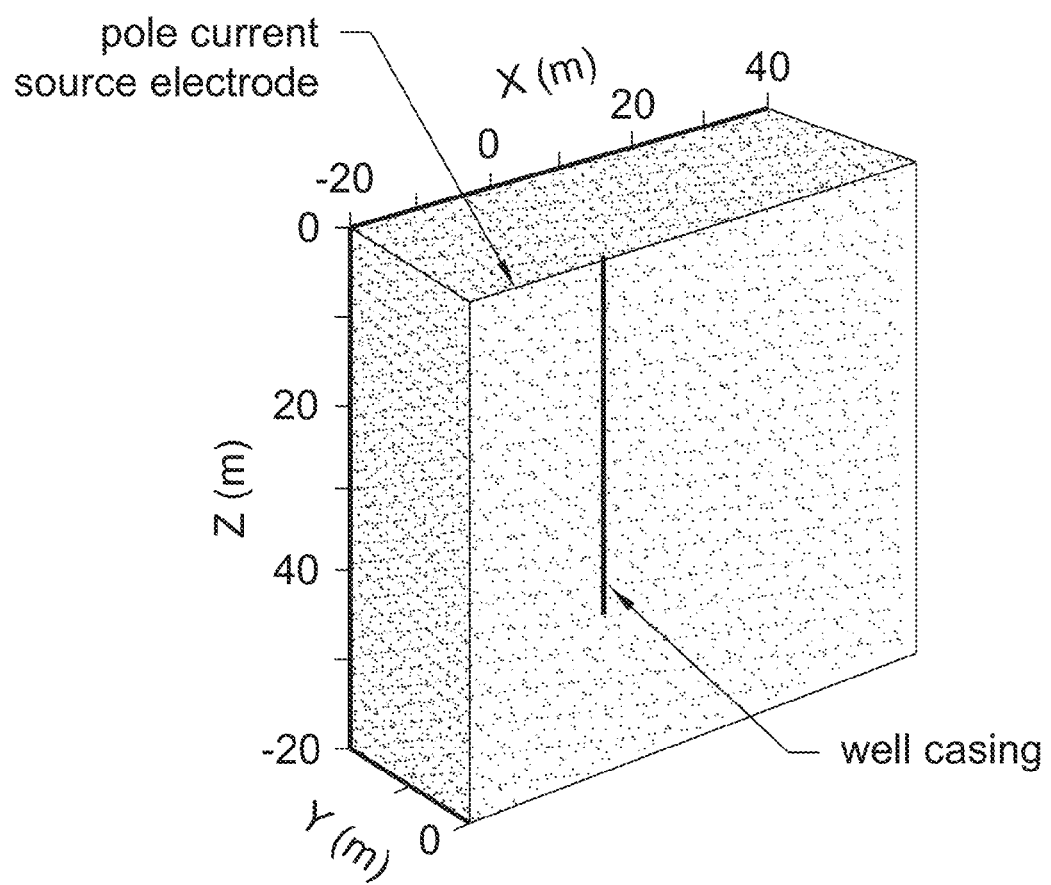
FIG. 7 shows A) computational mesh for a pole current source in the presence of an infinite conductivity vertical line—e.g. well casing; B) partial solution for the point current source; C) partial solution for the line source; D) analytic solution—or potential distribution per ampere of current injected; E) numeric solution; F) percent error distribution; and G) percent error histogram.
Figure 7B:
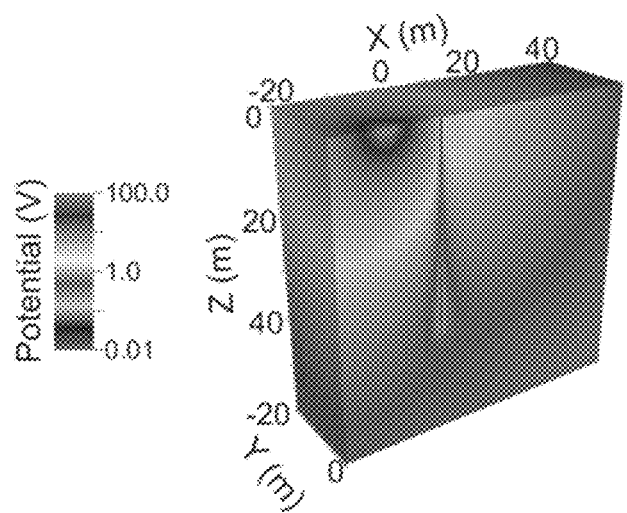
Figure 7C:
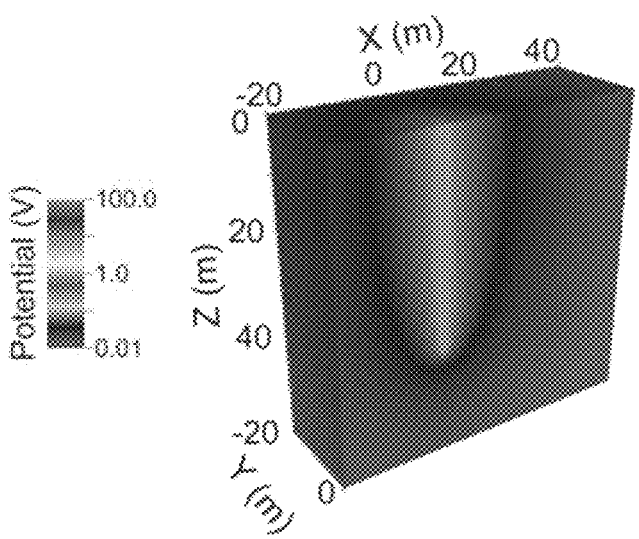
Figure 7D:
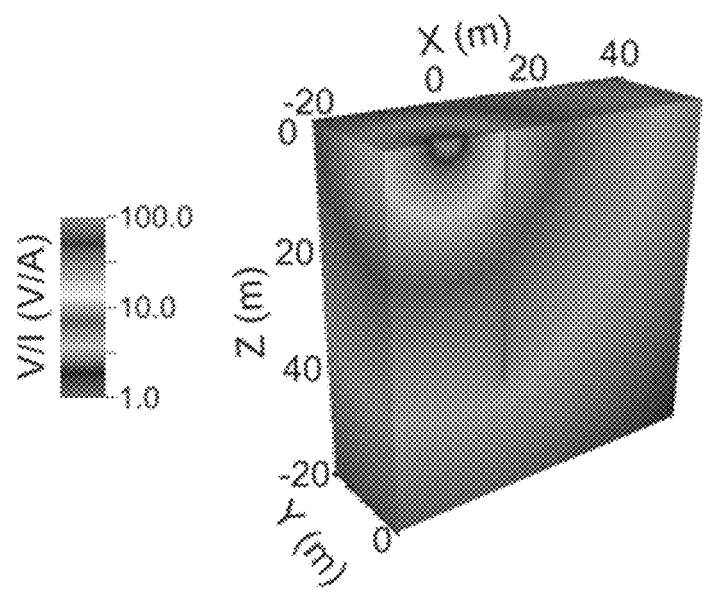
Figure 7E:
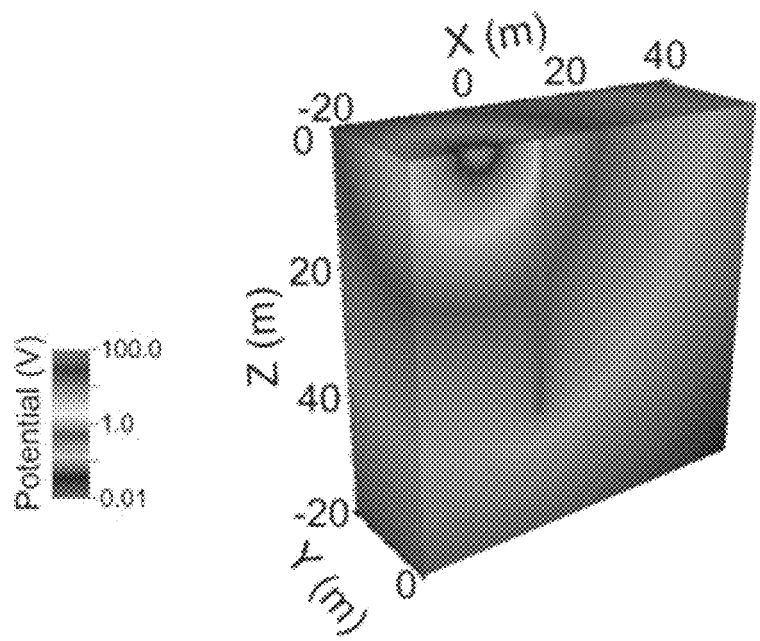
Figure 7F:
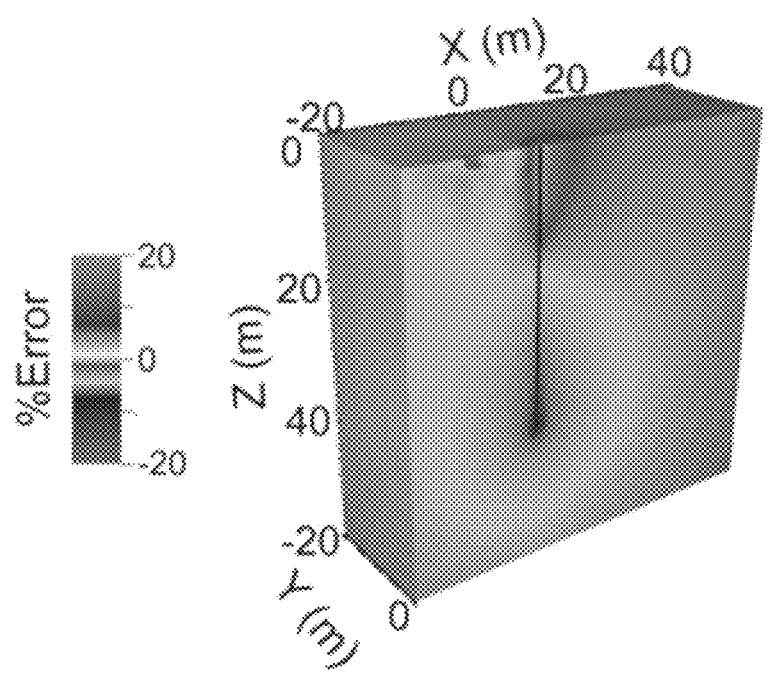
Figure 7G:
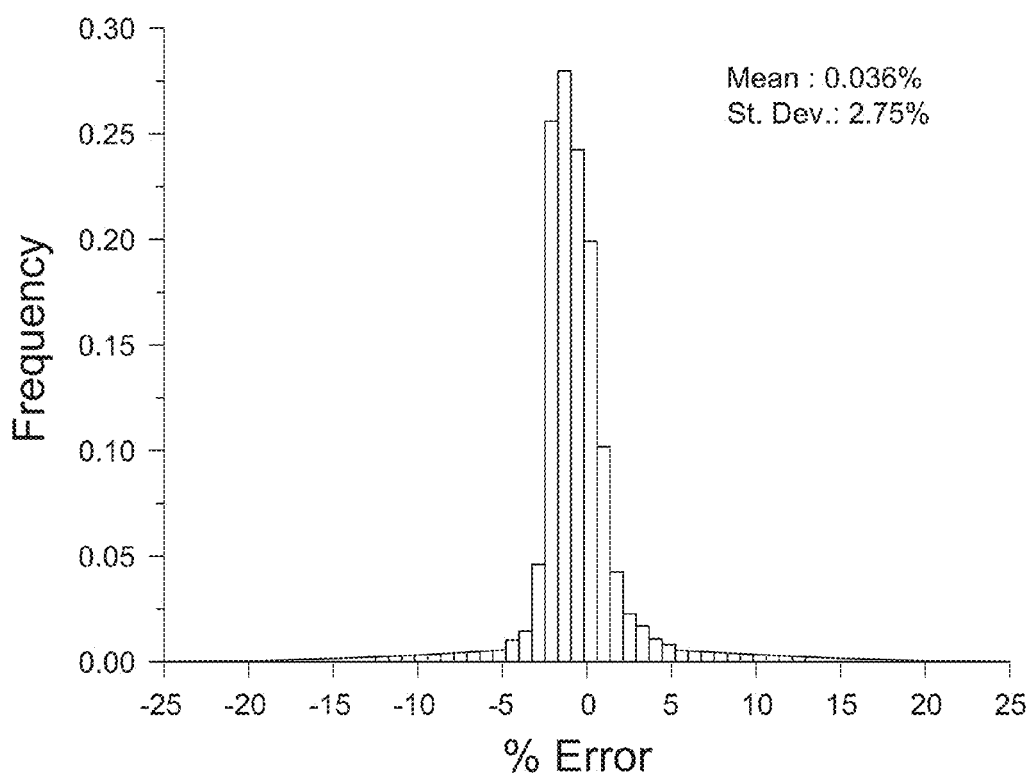

FIG. 6 shows a comparison of the analytic and numeric solutions computed for a current injection of 1 Ampere between two line sources (e.g. well casings). FIG. 6A shows a cutout of the computational mesh and the locations of the current source and sink lines. FIGS. 6B and 6C show the two partial solutions to equation 2 need to form the pole solutions, one for each line source. FIG. 6B shows the partial solution for the line source at (0,0) m. FIG. 6C shows the partial solution for the line source at (20,0) m. For each partial solution the potential on the source line is one volt and the potential on the remaining line is zero as required. As described previously, the partial solutions are scaled and summed so that the net current flux emanating from the pole line source is equal to one ampere and net flux through the remaining line source is zero, thereby providing the pole solution for the given line source. The pole solution for the line source at x=20 m is subtracted from the pole solution for the line source at x=0 m to provide the global solution shown in FIG. 6E, which is a numeric solution. For comparison, FIG. 6D shows the corresponding analytic solution— i.e., potential distribution per ampere of current injected—computed using equation 12. FIG. 6F shows the numeric solution error, which is given by:

$$\% \, Err_i = 100\left(\frac{\phi_i - \phi_{t,i}}{\phi_{t,i}}\right) \quad \text{eq. (13)}$$

where $\phi_{t,i}$ and $\phi_i$ are respectively the analytic and numeric potential solutions for node i. FIG. 6G shows the error histogram.

FIG. 7 compares the semi-analytic solution for a point current pole source in the presence of a vertical line of infinite conductivity. As with FIG. 6, the FIG. 7 shows: A) the computational mesh for a pole current source in the presence of an infinite conductivity vertical line (e.g., a well casing), B) the partial solution for the point electrode source (see equation 2), C) the partial solution for the line source (see equation 3), D) the semi-analytic solution (i.e., potential distribution per ampere of current injected), and E) the numeric solution, F) the percent error distribution or percent difference between the numeric and semi-analytic solution, and G) the percent difference histogram. Both FIGS. 6 and 7 display good agreement between analytic and numeric solutions, and demonstrate the accuracy of the numeric solution.

Figure 8A:
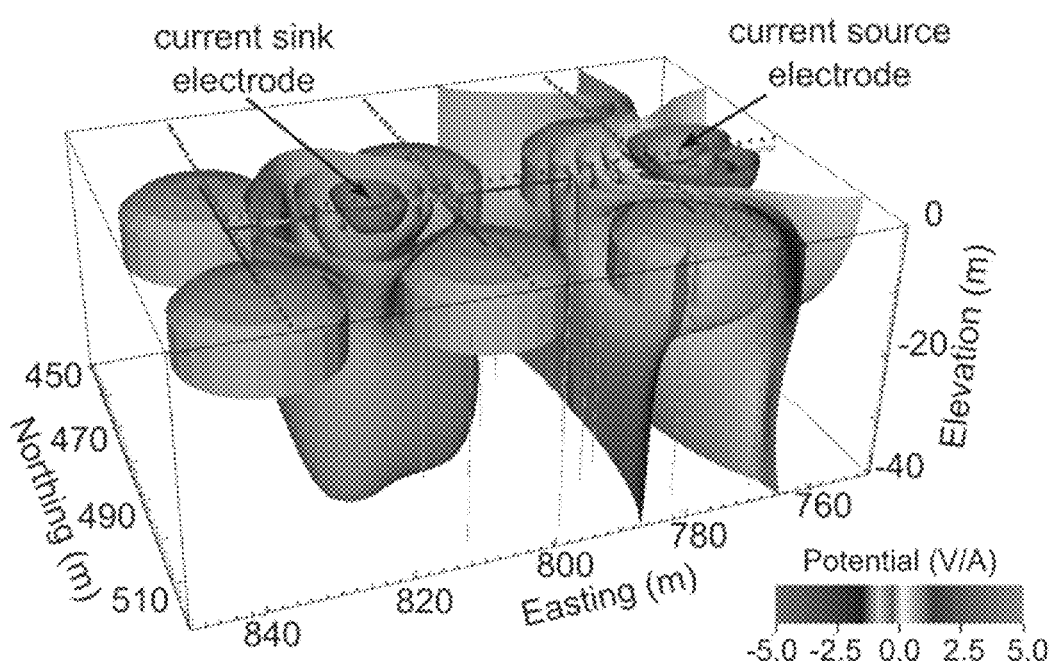
FIGS. 8A and 8B show two examples of potential distributions generated in the presence of the metallic subsurface infrastructure (tanks, pipes, and wells) illustrated in FIGS. 5A and 5B.
Figure 8B:
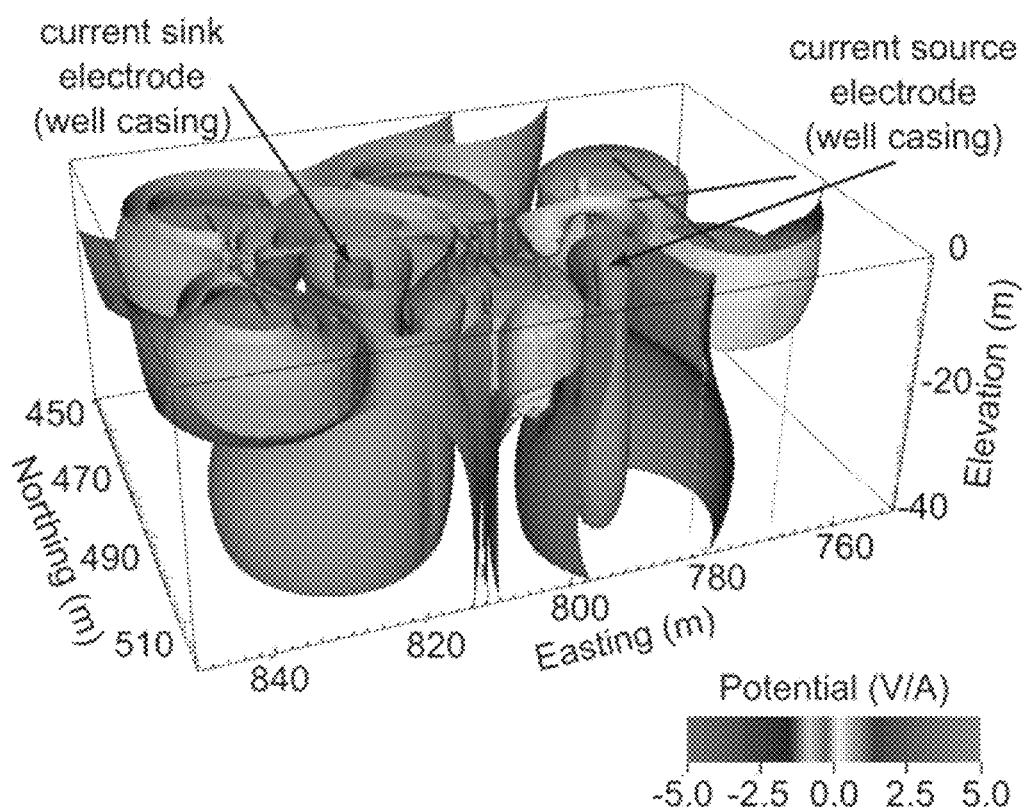

FIG. 8 shows two examples of potential distributions generated in the presence of the metallic subsurface infrastructure (tanks, pipes, and wells) illustrated in FIG. 5. FIG. 8A shows the potential generated from a 1 Ampere current injection between point source electrodes on the surface, and 8B shows the potential generated from a 1 Ampere current injection between two well casing line sources. Current flows perpendicular to constant potential isosurfaces, so the potentials are presented as isosurfaces to illustrate the nature of current flow through the subsurface. Careful inspection of 8A and 8B shows how the pipes and tanks provide primary current flow paths between source and sink electrodes, dramatically altering the potential field that would exist in the absence of the infrastructure. Isosurfaces are shown at +/−(10.0, 1.0, 0.1, and 0.001 V/A). Pipes and tanks are electrically connected. As current flows perpendicular to the isosurfaces, the isosurfaces indicate how current flows into and out of metallic features, and how those features influence the potential field. Noting the dominant influence the infrastructure exerts on the potential field, it is valid to conclude that erroneous modeling of infrastructure effects in this case and similar cases, such as assuming tanks are electrically isolated, will likely result in significant inversion artifacts as the inversion algorithm attempts to compensate for modelling error.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

I claim:

1. A method for imaging electrical conductivity distribution within a subsurface containing metallic structures with known locations and dimensions, the method comprising the steps of:
   a. generating electrical resistivity tomography measurements by injecting electrical currents into the subsurface and measuring electrical resistivity of items within the subsurface using multiple sets of electrodes;
   b. generating simulated data by applying a numeric code that simulates the measured resistivity of the known metallic structures;
   c. calculating tomographs from the simulated and measured electrical resistivity data; and
   d. applying an inversion code that removes the effects of the subsurface metallic structures with known locations and dimensions on the measured data.

2. The method of claim 1 wherein the numeric code is a forward model.

3. The method of claim 2 wherein the applying the forward model to simulate the subsurface potentials comprises a solution to a Poisson equation.

4. The method of claim 3 wherein the Poisson equation includes at least one of the following: integral calculations, analytical calculations, numerical calculations, partial solutions calculations, digital calculations, and an immersed interface boundary condition solution.

5. The method of claim 3 wherein the inversion code is applied so that the simulated electrical potentials match actual measured electrical potentials in the presence of the metallic structures.

6. The method of claim 4 wherein applying the inversion code includes generating an electrical conductivity distribution that minimizes error between the simulated electrical potentials and the actual potentials measured in the presence of the metallic structures.

7. The method of claim 2 wherein applying the forward model and the inversion produces a reconstructed three-dimensional image of the subsurface, while removing the effects of the subsurface metallic structures.

8. The method of claim 1 wherein the electrodes are at least one of the following: surface electrodes, well casing electrodes, arrays of point buried electrodes, and the metallic structures with known locations and dimensions used as electrodes.

9. The method of claim 1 wherein a boundary of each metallic structure is represented by nodes, faces, or segments of unstructured tetrahedral elements.

10. A method of locating features including leaks and leaked materials beneath a subsurface containing metallic infrastructures such as pipes and tanks with known locations and dimensions, the method comprising:
   a. injecting current and measuring electrical potential of the subsurface with multiple sets of electrodes in the presence of the metallic infrastructures, thus generating electrical resistivity tomography measurements;
   b. applying a forward model to simulate the subsurface electrical potential measurement of those metallic infrastructures; and
   c. performing an inversion of the forward model to generate an electrical conductivity distribution that minimizes error between the simulated electrical potentials and actual measured electrical potentials, while removing the effects of the metallic structures on the measured tomography measurements.

11. The method of claim 10 wherein the applying the forward model to simulate the electrical potential measurement comprises a solution to a Poisson equation.

12. The method of claim 11 wherein the Poisson equation is solved using an immersed interface boundary condition solution to simulate subsurface potentials generated in the presence of the metallic structures.

13. The method of claim 12 wherein the Poisson equation includes at least one of the following: integral calculations, analytical calculations, numerical calculations, partial solutions calculations, digital calculations, and an immersed interface boundary condition solution.

14. The method of claim 11 wherein applying the forward model and performing the inversion produces a reconstructed three-dimensional image of the subsurface, while removing the effects of the metallic structures.

15. The method of claim 10 wherein the electrodes are at least one of the following: surface electrodes, well casing electrodes, arrays of point buried electrodes, and the metallic structures used as electrodes.

16. The method of claim 10 wherein a boundary of each metallic structure is represented by nodes, faces, or segments of unstructured tetrahedral elements.

17. A method of imaging electrical conductivity distribution of features within a subsurface containing metallic structures with known locations and dimensions, the method comprising the steps of:
   a. injecting electrical currents into the subsurface to measure electrical potentials using multiple sets of electrodes, thus generating actual electrical resistivity tomography measurements;
   b. generating simulated electrical resistivity measurements by applying a Poisson equation to simulate the measured potentials in the presence of the metallic structures, wherein a boundary of each metallic structure is represented by nodes, faces, or segments of unstructured tetrahedral elements; and
   c. applying an inversion code to the simulated and actual electrical resistivity measurements to removes the effects of the subsurface metallic structures with known locations and dimensions on the actual data; and
   d.
   e. producing a reconstructed three-dimensional image of the subsurface electrical conductivity in the presence of the subsurface metallic structures.

18. The method of claim 17 wherein the Poisson equation includes at least one of the following: integral calculations, analytical calculations, numerical calculations, partial solutions calculations, digital calculations, and an immersed interface boundary condition solution.

19. The method of claim 17 wherein the electrodes are at least one of the following: surface electrodes, well casing electrodes, arrays of point buried electrodes, and the metallic structures used as electrodes.

20. The method of claim 17 wherein the inversion code is applied so that the simulated electrical potentials match actual measured electrical potentials in the presence of the metallic structures.

* * * * *